R. GITTINS.
ROOT HARVESTING MACHINE.
APPLICATION FILED JUNE 18, 1917.
1,241,108.
Patented Sept. 25, 1917.
4 SHEETS—SHEET 3.
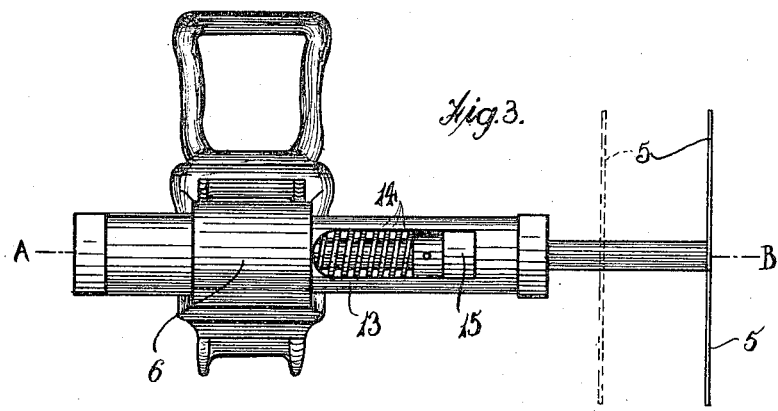
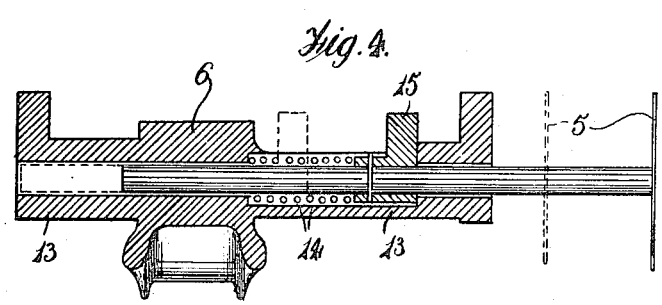
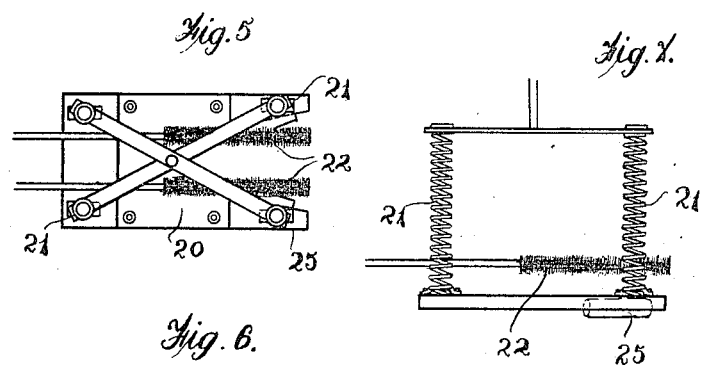
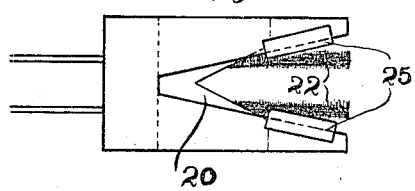
Inventor:-
Roger Gittins,
By: B. Singer
Atty

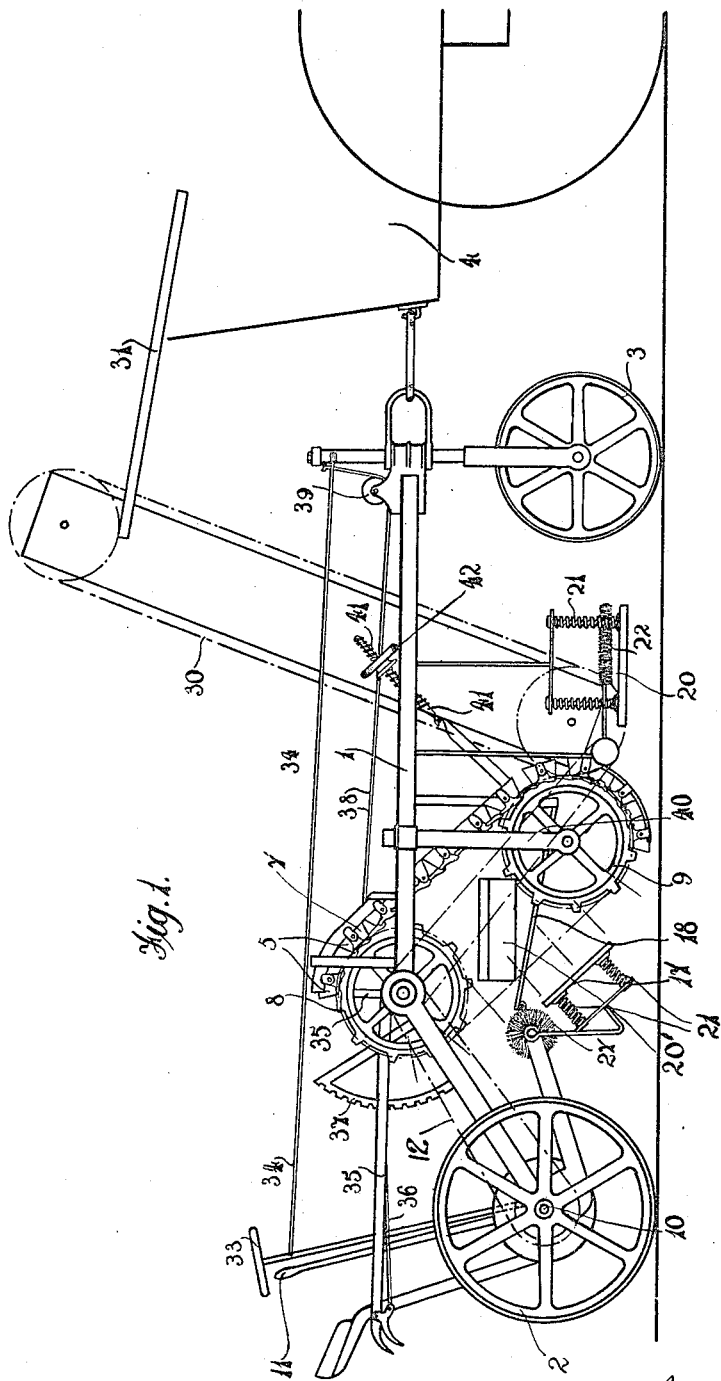

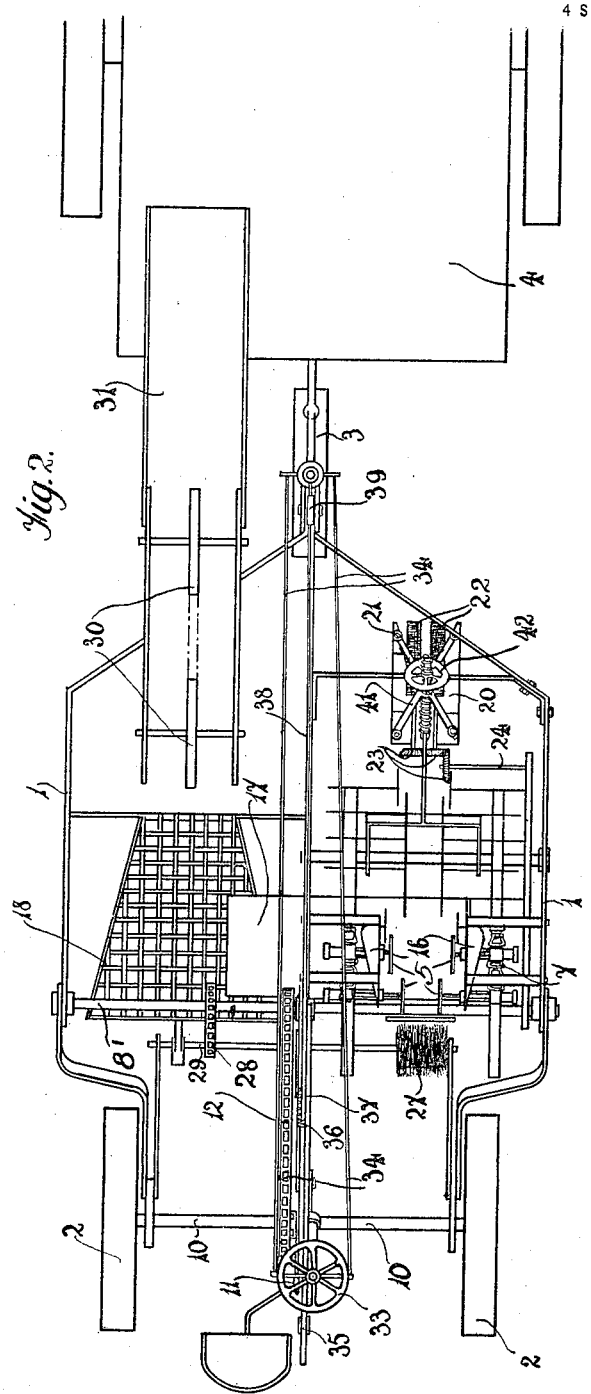

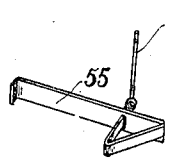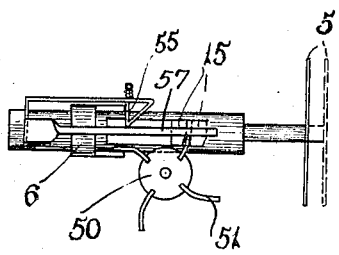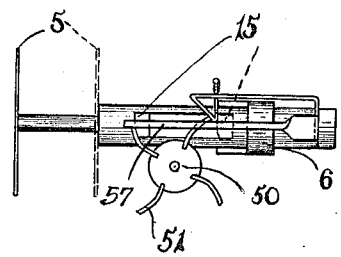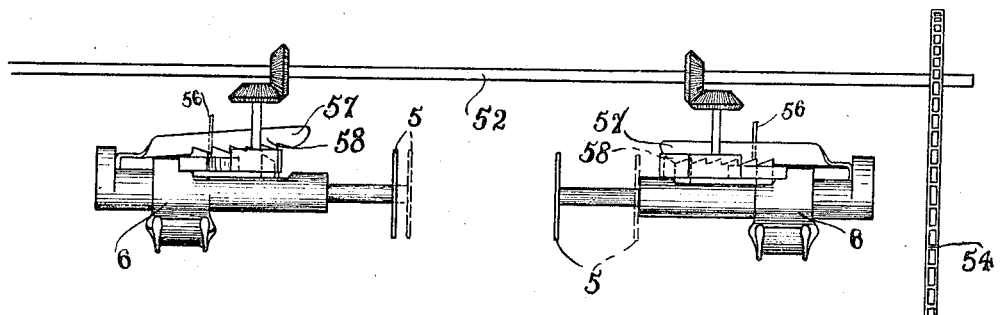

UNITED STATES PATENT OFFICE.

ROGER GITTINS, OF SHREWSBURY, ENGLAND.

ROOT-HARVESTING MACHINE.

1,241,108.  Specification of Letters Patent.  Patented Sept. 25, 1917.

Application filed June 18, 1917. Serial No. 175,497.

*To all whom it may concern:*

Be it known that I, ROGER GITTINS, of 71 Abbey Foregate, Shrewsbury, in the county of Salop, England, have invented a new and useful Root-Harvesting Machine; and I do hereby declare the following to be a full, clear, and exact description of the same.

My invention comprises improvements in root harvesting machines and has for its primary object to provide an improved automatic machine for this purpose.

A machine for harvesting roots according to this invention may embody in combination means for topping the roots, means for lifting them out of the ground, means for cutting off the bottom of the roots, a brush for cleaning the roots, a shaking grid for further cleaning the roots, and means for conveying them, such as to the side of the machine or to a cart.

According to this invention I provide a root harvesting machine having two rows of grippers carried by or forming part of endless bands traveling in the direction in which the machine travels, and provided with spring controlled means for pressing the two grippers toward each other to engage with the roots, and means for retracting the grippers and holding them out of engagement when not required to grip in order to release the roots.

Other features of the invention relate to improved mechanism for performing these various functions as hereinafter described and specified.

Referring to the drawings:—

Figure 1. is a side elevation of a machine according to this invention.

Fig. 2. is a plan of same.

Fig. 3. is a detail plan showing one of the spring actuated grippers for lifting the roots.

Fig. 4. is a sectional elevation at A—B in Fig. 3.

Fig. 5. is a plan showing the means for topping the roots.

Fig. 6. is an under side view of same.

Fig. 7. is a side elevation of same.

Fig. 8. is an elevation of a modified form of gripper control mechanism.

Fig. 9. is a plan of same.

Fig. 10. illustrates the retaining spring removed.

In carrying my invention into practice as illustrated upon the accompanying drawings, the general frame of the machine is indicated at 1, the rear driving wheels at 2, the front steering wheel at 3 and the cart at 4, the harvesting machine being drawn behind the cart.

The roots are adapted to be lifted by the spring grippers shown in detail in Figs. 3 and 4 and marked 5, these grippers being supported by suitable carriers marked 6 which are connected to or form part of an endless chain or band which is generally indicated by 7 in Fig. 1, this endless chain passing over the two sprocket wheels marked 8 and 9, the wheel 8 being driven from the shaft 10 supporting the rear wheels 2 through the driving chain marked 12, though if desired this drive may be through the medium of a suitable variable speed gear for varying the speed of the chain and grippers relatively to the rear wheels. The main drive to the gripper may be provided with clutch mechanism operated by the lever 11.

The grippers 5 are carried by a shaft 13; they are pressed outwardly by a spring 14 and provided with an abutment 15 which is adapted to be engaged by the inclined member 16 when the grippers reach the top of their travel, these inclines serving to draw outwardly the two rows of grippers or as it were to open the pairs of grippers, the grippers being released when they reach the ground when under the influence of the springs they will take a grip upon the root which is lifted as the endless band passes upwardly, when the grippers are again engaged by the inclines and opened when the root will fall into the transversely disposed conveying member or incline 17 whereby they are transported to the opposite side of the machine into the shaking grid 18 which operates in manner hereinafter explained.

In front of the endless band the topping device is located which comprises a V shaped knife or cutter 20 the height of which may be varied against the action of the springs 21 and also a pair of oppositely rotating brushes 22 which serve to collect and upwardly direct the root tops so as to bring them under the influence of the knives and to afterward throw them out of the path of the grippers. These brushes are rotated by the gear wheels 23 and shaft 24 as shown. To prevent the knife cutting the root inclined rollers 25 are provided as shown.

As the roots are passing upwardly under the control of the grippers they come into contact with a rotating brush 27 by which they are cleaned, this brush being driven by the chain 28 and shaft 29. A knife or cutter 20' of similar form and similarly spring mounted to the cutter previously described is located in front of this cleaning brush and serves to cut off the lower extremities or root of the turnip.

This shaft 29 also carries an eccentric cam or equivalent which imparts a rocking or jigging motion to the grid 18 serving the double purpose of shaking the dirt off the root and also of conveying it to the forward end of the grid where it is delivered to a bucket conveyer generally indicated by 30 which conveys the roots to the cart through the medium of the inclined member 31. Chain 28 is driven by shaft 8' which carries wheel 8.

The machine is adapted to be steered by means of the wheel 3 and cables 34, while the height of the grippers, knife, grid and conveyer relatively to the road wheels may be adjusted by means of the lever 35, catch 36, sector rack 37 and cable 38 passing under pulley 39.

The tension of the endless chain may also be varied by raising or lowering the member 40 which is strengthened against injury by means of the screwed link 41, and adjusting hand wheel 42.

The grippers are arranged in two rows facing each other and they are closely spaced so as to practically touch each other being cut away, however, so as to enable them to lie around the sprocket wheels, and as will be seen the machine will automatically top, lift and clean the roots afterward conveying them to the cart.

If desired a catch may be employed for locking the grippers in their retracted position until released by a tripping device disposed in a suitable position in the path of the catches.

At Figs. 8 and 9 a modified method of actuating the grippers is shown wherein in place of the cams rotating wheels 50 with projections 51 are driven by bevel gearing off a shaft 52 which is driven off the shaft 53 by the chain 54. The shaft 53 may be driven by a chain (not shown) from either shaft 8' or 29. The projections 51 on the wheels are adapted to engage with the projections 15 on the grippers and retract them until they are engaged by the spring catch 55 whereby they are held until a suitably disposed part of the machine (not shown) strikes the projection 56 and releases the grippers. A retaining member 57 having notches 58 is provided these notches serving to lie behind the projections 15 and support the grippers against any receding movement except under the influence of the projections 51. As will be seen the projections 51 lift the member 57 when retracting the projections 15.

Instead of employing a cart the member 31 may be formed transversely across the machine so that the roots may fall in a row alongside the machine and the said member may be made telescopic so that the rows of roots may be any distance from the machine or the shaking grid may deliver direct without the conveyer.

The machine may have two sets of grippers one on each side of the machine in which case the shaking grid and conveyer would be fixed in any suitable position, the machine then operating simultaneously upon the two rows of roots.

What I claim then is:—

1. In a root harvesting machine the combination of two rows of grippers carried by endless chains traveling in the direction of the travel of the machine, spring means for pressing the rows of grippers toward each other so as to engage with the roots; means for retracting the grippers and holding them out of engagement with the roots; a knife of V shape for cutting off a portion of the roots; and spring means for resiliently supporting said knife for permitting it to move when engaged by the root itself.

2. In a root harvesting machine the combination of two rows of grippers carried by endless chains traveling in the direction of the travel of the machine, spring means for pressing the rows of grippers toward each other so as to engage with the roots; means for retracting the grippers and holding them out of engagement with the roots; a knife of V shape for cutting off a portion of the roots; rollers on the knife adapted to be engaged by the root; and spring means for permitting a compensating movement of the knife.

3. In a root harvesting machine the combination of two rows of grippers carried by endless chains traveling in the direction of the travel of the machine; spring means for pressing the rows of grippers toward each other so as to engage with the roots; means for retracting the grippers and holding them out of engagement with the roots; a knife of V shape for cutting off a portion of the roots; spring means for resiliently supporting said knife for permitting it to move when engaged by the root itself; and rotating brushes for holding the parts of the roots to be cut off clear of the knife.

4. In a root harvesting machine the combination of two rows of grippers carried by endless chains traveling in the direction of the travel of the machine; spring means for pressing the rows of grippers toward each other so as to engage with the roots; means for retracting the grippers and holding them out of engagement with the roots; a knife of V shape for cutting off a portion of the roots; rollers on the knife adapted to be engaged by the root; spring means for permitting a compensating movement of the knife; and rotating brushes for holding the parts of the roots to be cut off clear of the knife.

5. In a root harvesting machine the combination of a pair of endless chains formed by gripper carriers pivoted together; a series of grippers carried by said chains; sliding shafts carrying the grippers; spring means for pressing the grippers toward the roots; means for retracting the grippers against the action of the springs; a projection on each of the gripper shafts; and rotating wheels having projections adapted to engage with said gripper shaft projections and to thus retract the grippers.

6. In a root harvesting machine the combination of a pair of endless chains formed by gripper carriers pivoted together; a series of grippers carried by said chains; sliding shafts carrying the grippers; spring means for pressing the grippers toward the roots; means for retracting the grippers against the action of the springs; a projection on each of the gripper shafts; rotating wheels having projections adapted to engage with said gripper shaft projections and to thus retract the grippers; pivoted spring catches for holding said grippers in their retracted positions; and means for releasing said catches and grippers.

7. In a root harvesting machine the combination of a pair of endless chains formed by gripper carriers pivoted together; a series of grippers carried by said chains; sliding shafts carrying the grippers; spring means for pressing the grippers toward the roots; means for retracting the grippers against the action of the springs; a projection on each of the gripper shafts; rotating wheels having projections adapted to engage with said gripper shaft projections and to thus retract the grippers; and means for preventing involuntary retraction of the grippers.

8. In a root harvesting machine in combination, means for holding and conveying the roots, a knife of V shape for cutting off a portion of the root, and spring means for resiliently supporting said knife for permitting it to move when engaged by the root itself.

9. In a root harvesting machine in combination, means for holding and conveying the roots, a knife of V shape for cutting off a portion of the root, spring means for resiliently supporting said knife for permitting it to move when engaged by the root itself, and rollers on the knife adapted to be engaged by the root.

10. In a root harvesting machine in combination, means for holding and conveying the roots, a knife of V shape for cutting off a portion of the root, and spring means for resiliently supporting said knife for permitting it to move when engaged by the root itself, and rotating brushes for holding the part of the root to be cut off clear of the knife.

In testimony whereof I affix my signature.

ROGER GITTINS.

Copies of this patent may be obtained for five cents each, by addressing the "Commissioner of Patents, Washington, D. C."